(12) United States Patent
Hsu

(10) Patent No.: US 6,972,504 B1
(45) Date of Patent: Dec. 6, 2005

(54) PERMANENT MAGNET MACHINE AND METHOD WITH RELUCTANCE POLES FOR HIGH STRENGTH UNDIFFUSED BRUSHLESS OPERATION

(75) Inventor: John S. Hsu, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 0 days.

(21) Appl. No.: 11/019,075

(22) Filed: Dec. 21, 2004

Related U.S. Application Data

(63) Continuation-in-part of application No. 10/848,450, filed on May 18, 2004.

(60) Provisional application No. 60/607,105, filed on Sep. 3, 2004.

(51) Int. Cl.[7] ............................................. H02K 1/27
(52) U.S. Cl. .................. 310/156.56; 310/191; 310/181
(58) Field of Search ............................. 310/191, 190, 310/181, 156.55–156.61, 51

(56) References Cited

U.S. PATENT DOCUMENTS

| | | | | |
|---|---|---|---|---|
| 3,411,027 A | * | 11/1968 | Rosenberg | .................. 310/181 |
| 6,057,622 A | | 5/2000 | Hsu | ........................... 310/191 |
| 6,097,124 A | * | 8/2000 | Rao et al. | .............. 310/156.26 |
| 6,441,525 B1 | * | 8/2002 | Koharagi et al. | ...... 310/156.56 |
| 6,573,634 B2 | | 6/2003 | Hsu | ........................... 310/266 |
| 6,703,741 B1 | | 3/2004 | Ifrim | ..................... 310/156.79 |
| 2002/0180297 A1 | | 12/2002 | Ifrim | ......................... 310/168 |
| 2004/0232794 A1 | * | 11/2004 | Hsu | ...................... 310/156.56 |
| 2005/0001505 A1 | * | 1/2005 | Hsu | ...................... 310/156.56 |

FOREIGN PATENT DOCUMENTS

| | | | | |
|---|---|---|---|---|
| EP | 803 962 | * | 10/1997 | ............ H02K 1/27 |
| JP | 2000-278899 | * | 10/2000 | ............ H02K 1/27 |

* cited by examiner

Primary Examiner—Karl Tamai
(74) Attorney, Agent, or Firm—Quarles & Brady LLP

(57) ABSTRACT

A method and apparatus in which a rotor (11) and a stator (17) define a radial air gap (20) for receiving AC flux and at least one, and preferably two, DC excitation assemblies (23, 24) are positioned at opposite ends of the rotor (20) to define secondary air gaps (21, 22). Portions of PM material (14a, 14b) are provided as boundaries separating the rotor pole portions (12a, 12b) of opposite polarity from other portions of the rotor (11) and from each other to define PM poles (12a, 12b) for conveying the DC flux to or from the primary air gap (20) and for inhibiting flux from leaking from the pole portions prior to reaching the primary air gap (20). The portions of PM material (14a, 14b) are spaced from each other so as to include reluctance poles (15) of ferromagnetic material between the PM poles (12a, 12b) to interact with the AC flux in the primary-air gap (20).

19 Claims, 6 Drawing Sheets

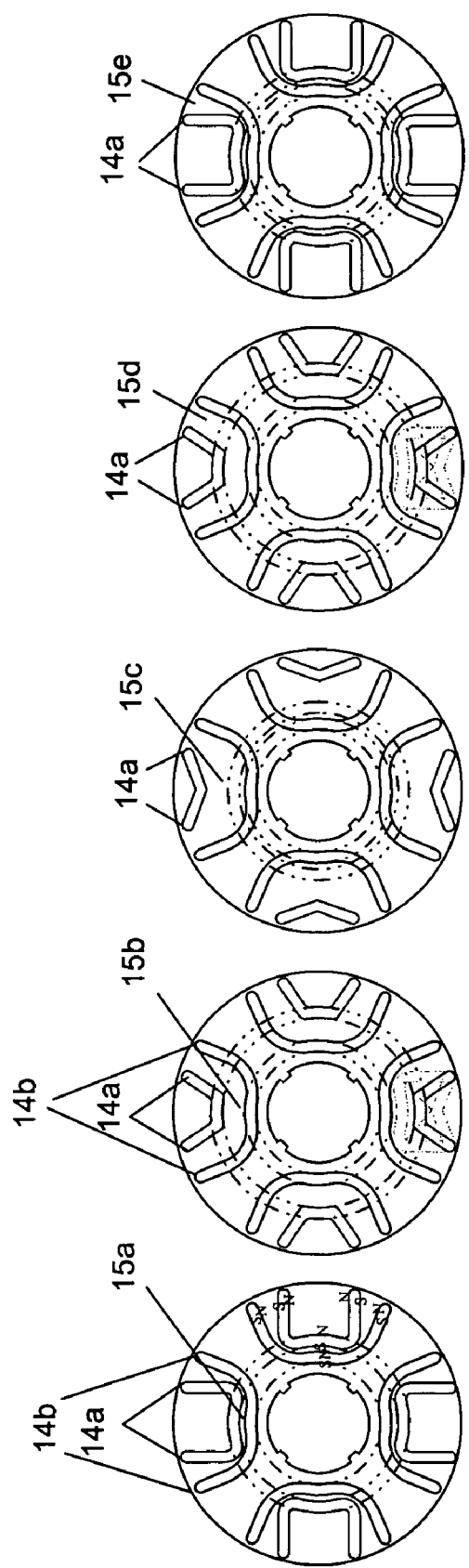

PERMANENT MAGNET MACHINE AND METHOD WITH RELUCTANCE POLES FOR HIGH STRENGTH UNDIFFUSED BRUSHLESS OPERATION

CROSS REFERENCE TO RELATED APPLICATION

This is a continuation-in-part of U.S. patent application Ser. No. 10/848,450 filed May 18, 2004. The benefit of priority based on U.S. Provisional Patent Application No. 60/607,105, filed Sep. 3, 2004, is also claimed herein.

STATEMENT REGARDING FEDERALLY SPONSORED RESEARCH

This invention was made with Government support under Contract No. DE-AC05-000R22725 awarded to UT-Battelle, LLC, by the U.S. Department of Energy. The Government has certain rights in this invention.

TECHNICAL FIELD

The field of the invention is brushless machines, including both AC and DC machines, including both motors and generators, and including induction machines, permanent magnet (PM) machines and switched reluctance machines.

DESCRIPTION OF THE BACKGROUND ART

There are three major types of brushless electric machines available for the electric vehicle (HV) and hybrid electric vehicle (HEV) drive systems. These are the induction machine, the PM machine, and the switched-reluctance machine.

Permanent magnet (PM) machines have been recognized for having a high power density characteristic. A PM rotor does not generate copper losses. One drawback of the PM motor for the above-mentioned application is that the air gap flux produced by the PM rotor is limited, and therefore, a sophisticated approach is required for high speed, field weakening operation. Another constraint is that inductance is low, which means that current ripple must be controlled.

It is understood by those skilled in the art that a PM electric machine has the property of high efficiency and high power density, however, the air gap flux density of a PM machine is limited by the PM material, which is normally about 0.8 Teslas and below. A PM machine cannot operate at an air gap flux density as high as that of a switched reluctance machine. When the PM motor needs a weaker field with a reasonably good current waveform for high-speed operation, a sophisticated power electronics inverter is required.

When considering a radial gap configuration for undiffused, high strength operation, several problems have to be overcome. It is desirable to provide a compact design with a shape similar to a conventional radial gap machine.

It would also be beneficial to further enhance the control of the field above that which is available with known PM rotor constructions. This would increase the motor torque. It is also an objective to accomplish this while retaining the compactness of the machine.

The enhanced field weakening can reduce the field strength at high speed to lower the back emf produced in the winding. Therefore, for a specified DC link voltage, the speed range of the machine can be increased over that it otherwise would be. This will meet the compactness objective and allow simplification of the drive system requirements.

The present invention continues the ability to enhance and weaken flux in the primary air gap, while improving the construction of the rotor.

SUMMARY OF THE INVENTION

This invention provides a high strength PM machine and method for brushless undiffused operation in which reluctance poles are added to permanent magnets (PM's) in a machine rotor to allow enhanced field control.

The invention is incorporated in a method and apparatus in which a rotor and a stator define a radial air gap for receiving AC flux and at least one and preferably two DC excitation assemblies are positioned at opposite ends of the rotor to define secondary air gaps. Portions of PM material are provided as boundaries separating the rotor pole portions of opposite polarity from an interior of the rotor and from each other to define PM poles for conveying the DC flux to or from the primary air gap and for inhibiting flux from leaking from said pole portions prior to reaching the primary air gap. The portions of PM material are spaced from each other so as to leave reluctance poles of ferromagnetic material between the PM poles to interact with the AC flux in the primary air gap.

In a further aspect of the invention, the flux path through the reluctance poles can be tapered in the direction of the flux paths through the rotor to reduce the size and weight of ferromagnetic material in the rotor. This also allows for two DC flux paths from opposite ends as well as for return paths for the DC flux.

The invention provide increased power and torque without increasing the size of the machine.

The invention is applicable to both AC and DC machines, and to both motors and generators.

The invention is provides a compact electric machine structure for application to electric or hybrid vehicles.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

BRIEF DESCRIPTION OF THE DRAWINGS

FIGS. 7–11 are transverse sectional views through the rotor of FIG. 5 taken in the planes indicated by the dashed lines in FIG. 5.

DETAILED DESCRIPTION OF THE PREFERRED EMBODIMENTS

The principle of a high strength, undiffused brushless machine has been previously disclosed in the Hsu, U.S. Pat. No. 6,573,634, issued Jun. 3, 2003, Hsu, U.S. patent application Ser. No. 10/688,586 filed Sep. 23, 2003, and Hsu U.S. patent application Ser. No. 10/848,450 filed May 18, 2004, the disclosures of which are hereby incorporated by reference.

For a conventional PM machine the air-gap flux density is about 0.6 to 0.8 Teslas and cannot be weakened without the aid of some sophisticated power electronics. Both the stationary excitation coil and the PM material in the rotor maximize rotor flux in the PM machine of the present invention. It can produce two to three times the air gap flux density of a conventional PM machine. Because the torque produced by an electric machine is directly proportional to the air gap flux density, a higher torque, more powerful machine is provided with only small additions to size and weight.

Figures 1, 2, 3:
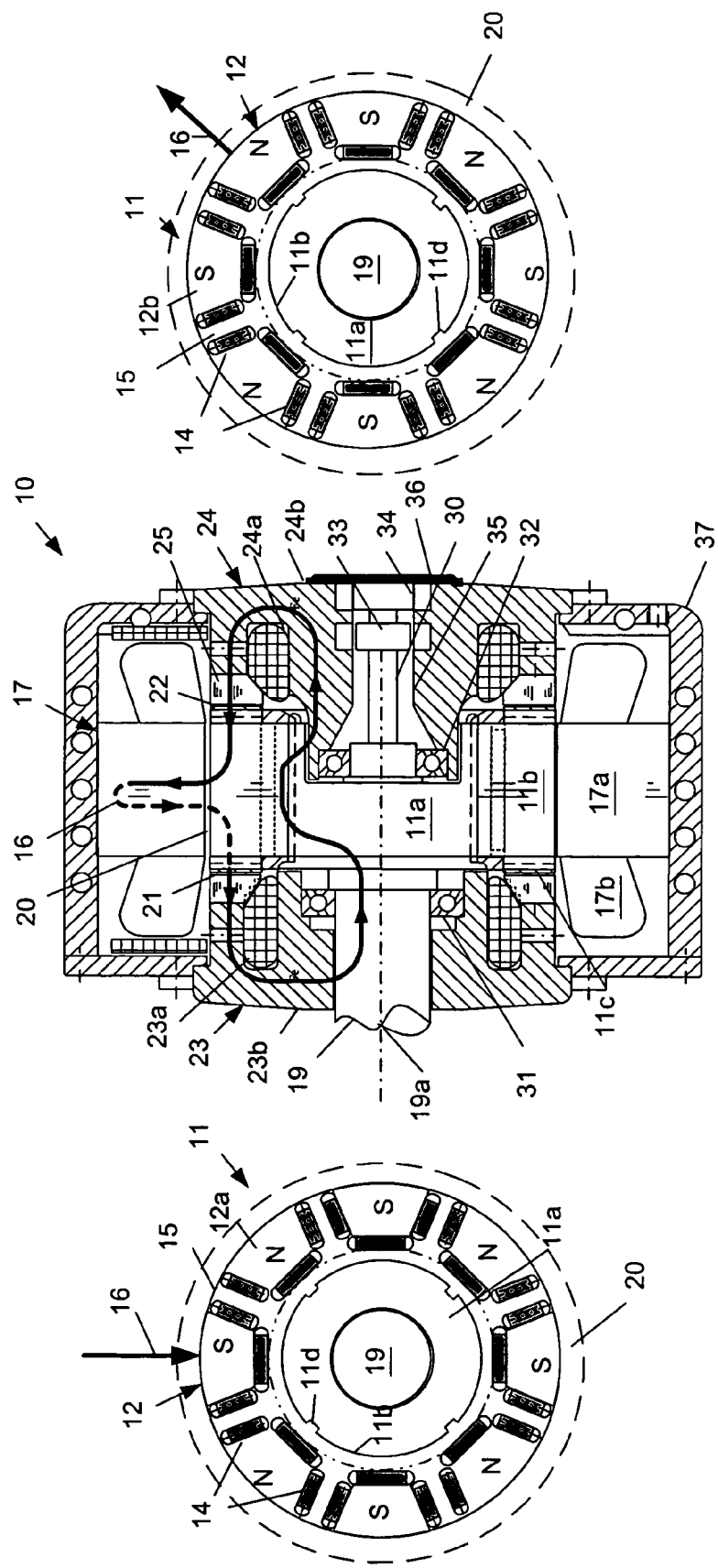
FIG. 1 is a longitudinal section view of a brushless PM machine with reluctance poles.
FIGS. 2 and 3 are end views of the rotor incorporated in the assembly in FIG. 1.

FIG. 1 shows a longitudinal section view of a radial gap, high strength undiffused machine 10 with eight PM poles 12a, 12b in a rotor assembly 11. FIGS. 2 and 3 each show the eight PM poles 12 bounded by eight sets of permanent magnets 14. Reluctance poles are provided by the portions of the rotor 15 positioned in between these sets of permanent magnets 14. The reluctance poles 15 allow the flux 16 produced by a stator 17 to go through these reluctance poles 15 easier than the path going through the PM poles 12a, 12b.

The rotor assembly 11 is preferably made as described in the disclosures cited above, namely, the rotor has a hub 11a and a plurality of laminations 11b of ferromagnetic material are mounted and stacked on the hub 11a and clamped by non-magnetic metal end pieces 11c. The rotor laminations 11b and end pieces 11c have keyed projections 1id for insertion in keyways in the rotor hub 11a. The stacked laminations 11c reduce the occurrence of eddy currents resulting from the flux which travels through in an axial direction through the rotor assembly 11.

PM pole pieces 12a (N), 12b (S) are disposed in longitudinal grooves and retain the PM magnetic material 14 in place in still deeper grooves with the assistance of adhesives. The PM magnetic material 14 can be pre-formed pieces or the injected type. Between pieces of PM material 14, an epoxy material can be used to fill gaps. PM pole faces (not shown) are separate pieces attached to the ends of the rotor assembly 11 to hold the PM pole pieces 12a, 12b and magnets 14 in position.

It is also possible add two end rings of a soft magnetic material to the ends of the stack of laminations 11a before adding the clamping pieces 11c. The end rings provide smoothing for flux in a circumferential direction around an axis of rotation 19a. The pole faces can also made of a soft magnetic material, such as steel. They can be attached to the thin steel end rings by rivets, screws, welds, or any feasible means. The thin steel rings hold the pole pieces in place against centrifugal force. Alternatively, end pole faces can be held by rivets.

The machine 10 has two DC excitation assemblies 23 and 24 at opposite ends of the rotor assembly 11. The DC excitation assemblies 23, 24 each include a stationary, ring-shaped excitation core 23b, 24b and a multi-turn coil 23a, 24a for receiving direct current from an external source. This DC current can be of a first polarity or of a second opposite polarity. The cores 23b, 24b encircle the rotor shaft 11 and are mounted to a machine housing 37. The cores can be made of iron, steel, another iron alloy or a compressed powder ferromagnetic material. A stationary toroidal excitation coil 23a, 24a fits in an annular recess in each excitation core 23b, 24b.

The rotor assembly 11 rotates with a main drive shaft 19 around an axis of rotation 19a. The stator 17 is disposed around the rotor 11 and has a laminated core 17a and windings 17b as seen in a conventional AC machine. The rotor assembly 11 is separated from the stator 17 by a radial air gap 20, which is also referred to herein as the primary air gap. AC flux is produced in this air gap 20 by the stator field. The rotor assembly 11 is separated from the DC excitation assemblies 23 and 24 by air gaps 21 and 22, respectively. These air gaps 21, 22 are oriented axially relative to the axis 19a of the rotor 11. DC flux will be produced in these air gaps 21, 22 by the DC excitation assemblies 21 and 22. Flux collector rings 25 are disposed between the axial air gaps 21, 22 and the DC excitation assemblies 23 and 24 to smooth the DC flux component and reduce the possible occurrence of eddy currents.

The drive shaft 19 is supported by bearings 31 and 32. The cores 23b, 24b for the excitation assemblies form brackets for these bearings 31, 32. The bearing brackets conduct DC magnetic flux. If needed, the ceramic bearings or insulated bearings (i.e., an electrically insulating material is used to isolate the rotor outer ring to the bearing housing) can be used. A short internal shaft 30 is also coupled to the rotor 11. A shaft encoder 33 and a pump 34 for lubricant for the motor 10 are situated inside a passageway 35 through the core 24. A housing cover 36 closes the passageway 33.

Figure 14:
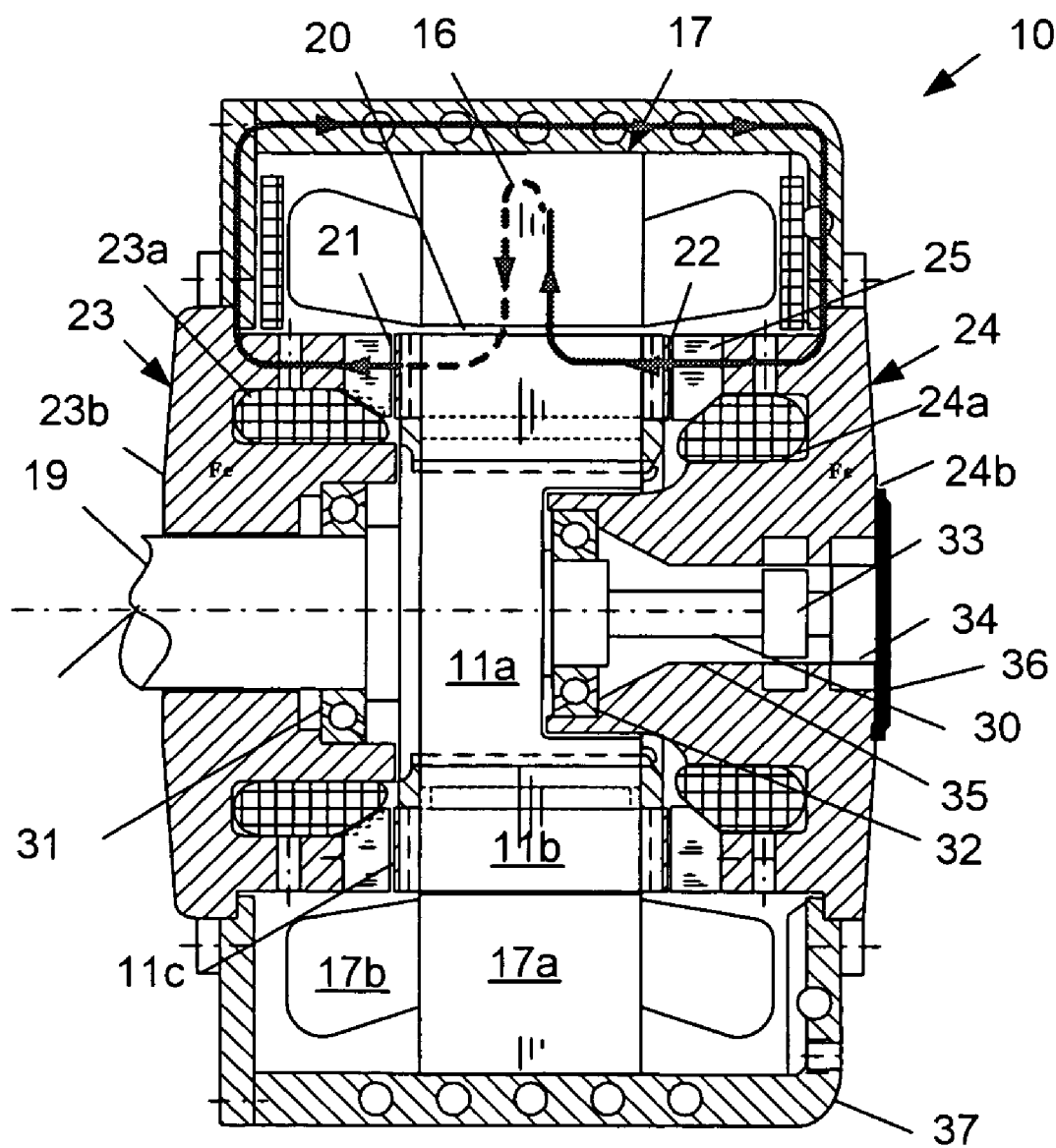
FIG. 14 shows that the externally excited DC flux return path can go through the stator instead of the rotor if the frame (or portion of the frame) is made of magnetically conducting material.

Referring to FIG. 2, the DC flux 16 produced by the excitation assemblies 23, 24 is conducted into the rotor from one set of the PM side poles 12a of N polarity, and then turns to flow radially outward across the main air gap 20 into the stator core 17a, then loops and returns radially inward and is conducted axially outward through adjacent poles 12b of S polarity at the other end of the rotor 11 (FIG. 3). The DC flux 16 produced by the excitation coils does not pass through the reluctance poles 15. FIG. 1 illustrates a flux path 16 for only one of the pole pairs. The other pole pairs would have flux paths of the same pattern. The DC flux return path 16 shown in FIG. 1 is using the rotor 11 for its return path. Normally, a return path is located in the rotor 11 is more compact than a return path through the aluminum motor housing 37. This is because the diameter of the rotor 11 is smaller than that of a stator frame for conducting the DC return flux. However, it is possible to use the stator frame for its DC flux return path. FIG. 14 shows that the externally excited DC flux return path can go through the stator instead of the rotor if the frame (or portion of the frame) is made of magnetically conducting material.

Referring to FIGS. 2 and 3, the PM material 14 together with the excitation current going through the excitation coils 23a and 24a produce the north (N) and south (S) poles on the exterior of rotor 11 that faces the stator 17 and the radial air gap 20. This rotor flux in the radial air gap 20 can be either enhanced or weakened according to the polarity of the DC excitation in the excitation assemblies 23, 24 that face the ends the rotor 11. Subsequently, the radial air gap 20 receives the rotor flux from the rotor 11, which interacts with the primary flux induced by the stator windings 17b to produce a torque.

Figure 4A:
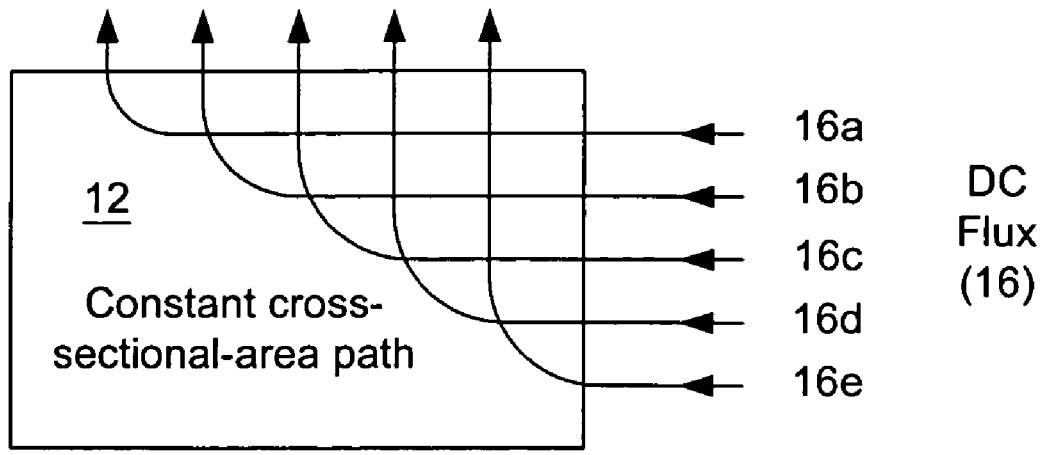
FIGS. 4a and 4b are diagrams illustrating how the portion of the rotor carrying the flux through reluctance poles can be tapered and reduced to the portion actually carrying the flux.
Figure 4B:
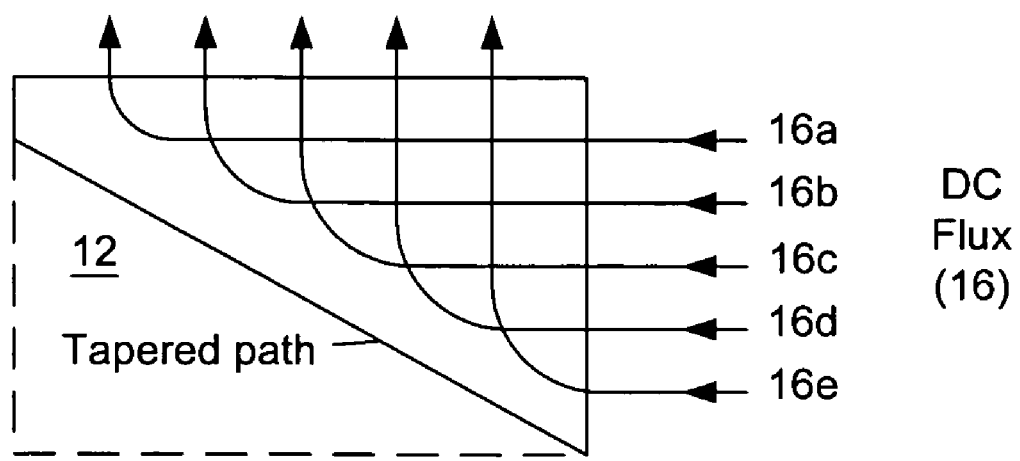

Referring to FIGS. 4a and 4b, the DC flux in an axial direction turns to the radial direction (i.e. a 90-degree turn). Assuming the depth (i.e. the distance going into the paper) of the paths shown in FIGS. 4a and 4b is a constant, FIG. 4a shows that the DC flux component 16e entering the bottom of the pole piece material 12 makes the 90-degree turn first, followed by successive flux components 16b–16d, until the component at the top 16a turns upward last. This provides a tapered flux path 16 in which a portion of the pole piece material 12 in the rotor 11 is not utilized. FIG. 4b shows that a material-saving flux path can be provided a tapered-shape of the pole piece material 12. As the depth of the path changes, the contour of the tapered path is not a straight line, in order to maintain a cross sectional area that is inversely proportional to the distance down the path.

Figure 5:
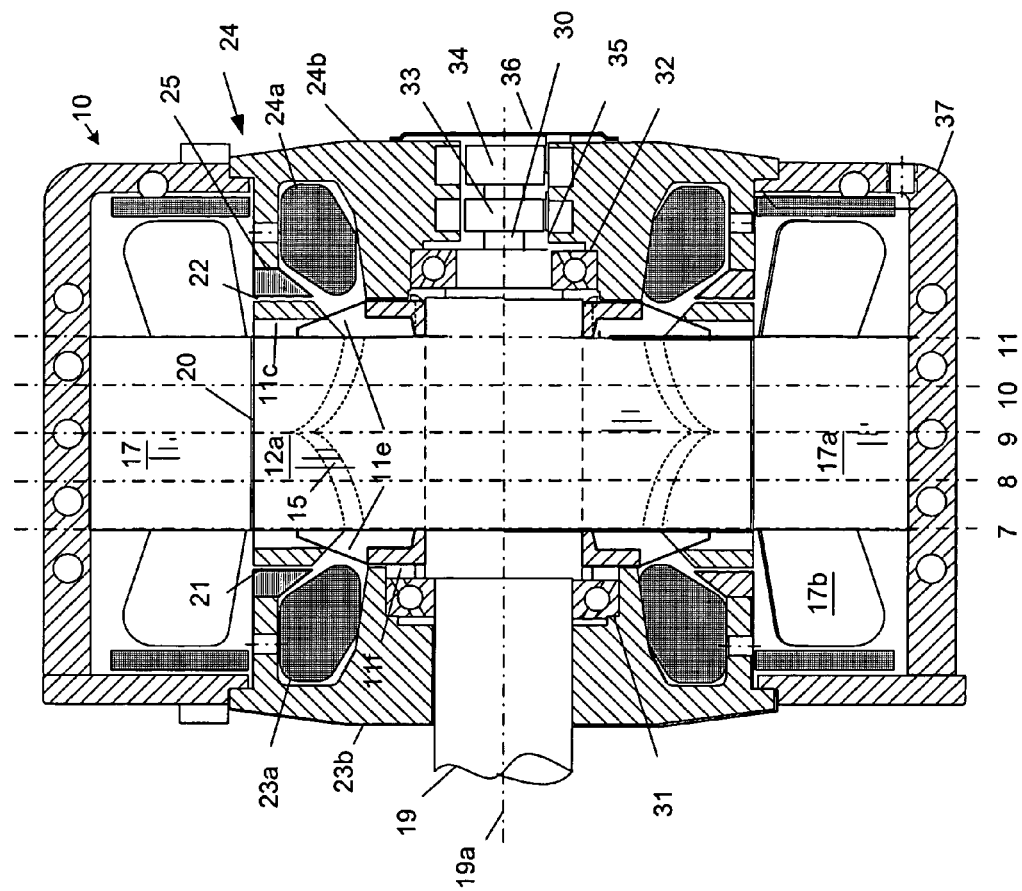
FIG. 5 is a longitudinal section view of a brushless PM machine having a rotor with reluctance poles and a tapered flux path according to the present invention.
Figure 6:
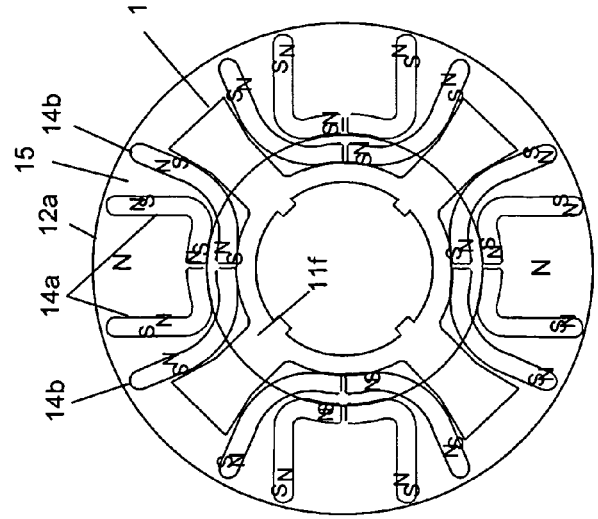
FIG. 6 is an end view of the rotor seen in FIG. 5.

FIG. 5 shows a modification to the rotor 11. This provides a pole piece 12a tapered in a direction parallel to axis 19a. The tapered pole piece 12a means that the DC flux going into the first side poles sees a gradually smaller cross sectional area. At the middle section of the rotor 11, the cross-sectional area of the pole piece 12a is nearly zero. The tapered flux path is separated from other parts of the rotor by sets of PM material 14a seen in FIG. 6. Second sets of PM material 14b are spaced from the first sets of PM material 14a to define reluctance poles 15.

The cross section of this flux path is seen in the sectional views of the rotor at the axial locations shown in FIGS. 7–11. As seen in FIGS. 7–11, the spacing between the sets of PM magnets 14a, 14b defines eight N-S PM poles 12a, 12b and eight reluctance poles 15, pairs of these poles 15 being connected through a narrow cross sectional area 15a seen in FIG. 7. This cross sectional area 15b, 15c then becomes progressively wider in FIGS. 8 and 9. This cross sectional area then becomes progressively narrower 15d, 15e in FIGS. 10 and 11. This provides a flux path 18a, 18b shown in FIG. 13 for two of the reluctance poles 15.

Figure 12:
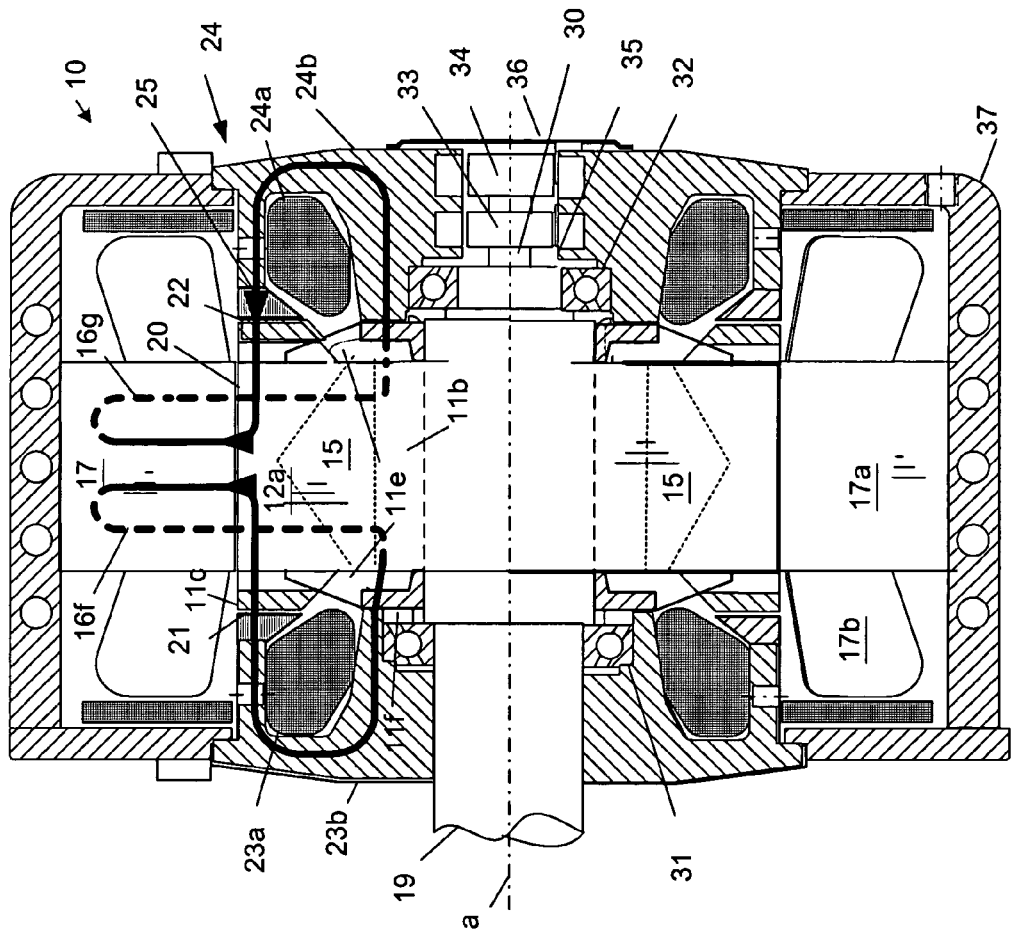
FIGS. 12 and 13 are longitudinal section and end views of a brushless PM machine of the present invention having a tapered flux portion and showing the flow of flux through the rotor and adjoining air gaps.

FIG. 12 illustrates two parallel DC flux paths 16f, 16g for the PM poles 12. Unlike the series DC flux path (see FIG. 1) that has the flux going into the side poles at one end of the rotor 11 and coming out from the other end of the rotor 11, the parallel DC flux paths 16f, 16g illustrated here have flux entering the rotor from both sides through the secondary air gaps 21, 22. From there, the flux turns ninety degrees to cross the primary air gap 20 and then return across the primary air gap to the core assemblies 23, 24 across the secondary air gaps 21, 22 (the return path being represented by the dashed line in FIG. 12).

FIG. 12 also illustrates two additional retaining pieces each having a central ring-shaped portion 11f and four radially extending flanges 11e for holding the rotor assembly 11 together.

Figure 13:
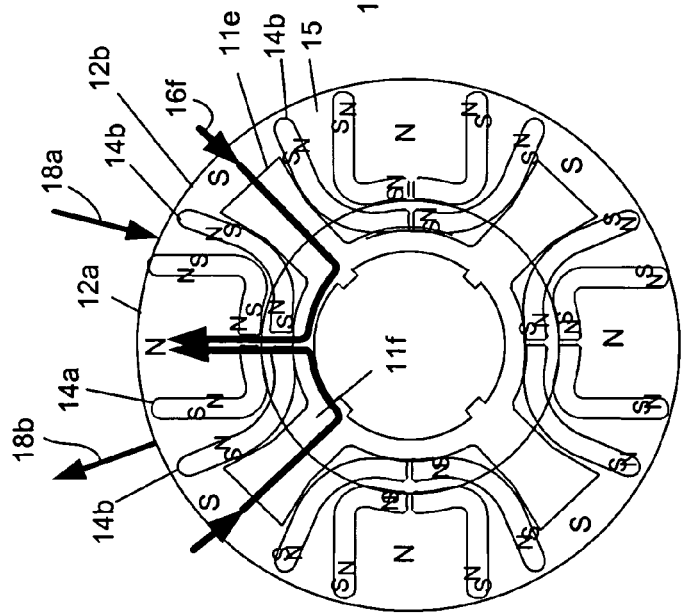

As seen in FIG. 13, the invention provides a reluctance pole flux path 18a, 18b between the reluctance poles 15 of the brushless machine 10. In addition, FIGS. 12 and 13 show that the return path for the DC flux 16f enters a south (S) polarity return pole 12b situated between two of the second sets of PM magnets 14b, is conducted into the laminations 11b, and then is conducted through gaps in the PM material 14a, 14b to reach the cooperating N pole 12a. The north-south polarity of the pieces of magnetic material 14a around the N poles is such that the N-polarity material faces the N poles and the S-polarity material faces away from the N poles. The north-south polarity of the pieces of magnetic material 14b around the S poles is such that the S-polarity material faces the S poles and the N-polarity material faces away from the S poles. The DC flux paths 16f, 16g are generally of the same configuration (symmetrical) and of equal strength in this embodiment but could be asymmetrical and of unequal strength in alternative embodiments.

By controlling energization of the core assemblies 23, 24, field weakening can be used to reduce the DC field strength at high speed to lower the back emf produced in the winding. Therefore, under a given DC link voltage the speed range of the machine can be increased. This again meets the compactness objective by simplifying the drive system requirement.

The invention is applicable to both AC synchronous and DC brushless machines and to both motors and generators.

This has been a description of the preferred embodiments of the invention. The present invention is intended to encompass additional embodiments including modifications to the details described above which would nevertheless come within the scope of the following claims.

I claim:

1. A brushless electric machine comprising:
   a cylindrical stator;
   a rotor having an axis of rotation, the rotor being spaced from the stator to define an annular primary air gap that receives an AC flux from the stator, the rotor having longitudinal pole portions running parallel to the axis of rotation and alternating in polarity around a circumference of the rotor;
   at least a first stationary excitation coil assembly for receiving direct current from an external source and being positioned across a secondary air gap from one end face of the rotor so as to induce a DC flux in the rotor which increases a resulting flux in the primary air gap when said direct current is of a first polarity and which reduces the resulting flux in the primary air gap when said direct current is of a second polarity opposite said first polarity; and
   wherein portions of permanent magnet (PM) material are positioned to form boundaries separating the rotor pole portions of opposite polarity from an interior of the rotor and from each other to define PM poles for conveying the DC flux to or from the primary air gap and for inhibiting flux from leaking from said pole portions prior to reaching the primary air gap when said direct current is of the first polarity; and
   reluctance poles of ferromagnetic material positioned between the PM poles to produce reluctance torque in the rotor in response to AC flux in the primary air gap, wherein said reluctance poles have a cross section that varies in an axial direction relative to the rotor.

2. The brushless machine of claim 1, wherein the reluctance poles extend radially with respect to a geometrical center of the rotor to an outer circumference of the rotor.

3. The brushless machine of claim 1, wherein the rotor has a hub that provides a portion of a return path for the DC flux to the first stationary excitation coil assembly.

4. The brushless machine of claim 1, wherein said rotor has a body portion that is cylindrical except for longitudinally extending grooves, wherein PM material is disposed in said grooves and wherein elongated pole pieces are disposed in said grooves over the PM material to form a cylindrical rotor with poles of alternating polarity on a rotor circumference that are separated by PM material.

5. The brushless machine of claim 1, wherein the machine is a brushless AC synchronous machine.

6. The brushless machine of claim 1, wherein the machine is a brushless DC machine.

7. The brushless machine of claim 1, wherein the machine is a motor.

8. The brushless machine of claim 1, wherein the machine is a generator.

9. A brushless electric machine comprising:

a cylindrical stator;

a rotor having an axis of rotation, the rotor being spaced from the stator to define an annular primary air gap that receives an AC flux from the stator, the rotor having longitudinal pole portions running parallel to the axis of rotation and alternating in polarity around a circumference of the rotor;

at least a first stationary excitation coil assembly for receiving direct current from an external source and being positioned across a secondary air gap from one end face of the rotor so as to induce a DC flux in the rotor which increases a resulting flux in the primary air gap when said direct current is of a first polarity and which reduces the resulting flux in the primary air gap when said direct current is of a second polarity opposite said first polarity; and wherein portions of permanent magnet (PM) material are positioned to form boundaries separating the rotor pole portions of opposite polarity from an interior of the rotor and from each other to define PM poles for conveying the DC flux to or from the primary air gap and for inhibiting flux from leaking from said pole portions prior to reaching the primary air gap when said direct current is of the first polarity;

wherein at least one pole portion in each pair of rotor pole portions is provided by ferromagnetic pole material and extends longitudinally from the secondary air gap towards a middle of the rotor; and wherein the pole material has a relative greater cross section at the secondary air gap and tapers to a relatively narrower cross section proximate the middle of the rotor to conduct flux that turns ninety degrees from the secondary air gap to reach the primary air gap.

10. A brushless electric machine comprising:

a cylindrical stator;

a rotor having an axis of rotation, the rotor being spaced from the stator to define an annular primary air gap that receives an AC flux from the stator, the rotor having longitudinal pole portions running parallel to the axis of rotation and alternating in polarity around a circumference of the rotor;

at least a first stationary excitation coil assembly for receiving direct current from an external source and being positioned across a secondary air gap from one end face of the rotor so as to induce a DC flux in the rotor which increases a resulting flux in the primary air gap when said direct current is of a first polarity and which reduces the resulting flux in the primary air gap when said direct current is of a second polarity opposite said first polarity; and wherein portions of permanent magnet (PM) material are positioned to form boundaries separating the rotor pole portions of opposite polarity from an interior of the rotor and from each other to define PM poles for conveying the DC flux to or from the primary air gap and for inhibiting flux from leaking from said pole portions prior to reaching the primary air gap when said direct current is of the first polarity;

further comprising a second stationary excitation coil assembly for receiving direct current from an external source and being positioned across a second secondary air gap on an opposite end of the rotor from the first-mentioned secondary air gap; and wherein at least one pole portion in each pair of rotor pole portions is provided by ferromagnetic pole material and extends longitudinally from the secondary air gap towards a middle of the rotor; and wherein the pole material in the at least one pole portion has a relative greater cross section facing each of the secondary air gaps and tapers to a relatively narrower cross section towards the middle of the rotor to conduct flux from each end of the rotor that turns ninety degrees from a respective one of the secondary air gaps to reach the primary air gap.

11. The brushless machine of claim 10, wherein a return path for the DC flux to the first and second stationary excitation coil assemblies is provided by the rotor.

12. The brushless machine of claim 10, wherein a return path for the DC flux to the first and second stationary excitation coil assemblies is provided by the stator frame and stator core.

13. The brushless machine of claim 10, wherein a return path for the DC flux to the first and second stationary excitation coil assemblies is provided by the stator frame, stator core, and rotor core.

14. A method of controlling flux in a brushless electrical machine, the method comprising:

inducing an AC flux in a rotor from a stator across a radial air gap by conducting a current in a primary excitation winding on the stator;

positioning a first secondary excitation coil at one end of the rotor;

conducting a direct current through the first secondary excitation coil so as to produce a DC flux in the rotor across at least one axial air gap and to produce a resultant flux in radial air gap resulting from the AC flux and the DC flux;

providing portions of permanent magnet (PM) material as boundaries separating the rotor pole portions of opposite polarity from an interior of the rotor and from each other to define PM poles, and for conveying the DC flux between the primary air gap and the axial air gap through the PM poles and for inhibiting flux from leaking from said PM poles prior to reaching the primary air gap when said direct current is of the first polarity; and spacing the portions of PM material so as to include reluctance poles of ferromagnetic material between the PM poles to interact with the AC flux in the primary air gap, and providing said reluctance poles with a cross section that varies in an axial direction relative to the rotor.

15. The method of claim 14, wherein said second flux has a first component that is controlled in the rotor by current in the first secondary excitation coil and further comprising conducting a direct current through a second secondary excitation coil at an opposite end of the rotor from the first secondary excitation coil, so as to induce a second component of said DC flux across a second axial air gap.

16. The method of claim 14, wherein the machine is operated as a brushless AC synchronous machine.

17. The method of claim 14, wherein the machine is operated as a brushless DC machine.

18. The method of claim 14, wherein the machine is operated as a motor.

19. The method of claim 14, wherein the machine is operated as a generator.

* * * * *

UNITED STATES PATENT AND TRADEMARK OFFICE
CERTIFICATE OF CORRECTION

PATENT NO. : 6,972,504 B1
APPLICATION NO. : 11/019075
DATED : December 6, 2005
INVENTOR(S) : John S. Hsu It is certified that error appears in the above-identified patent and that said Letters Patent is hereby corrected as shown below:

Column 3,
Line 47, "lid" should be -- 11d --.

Signed and Sealed this

Eleventh Day of July, 2006

JON W. DUDAS
*Director of the United States Patent and Trademark Office*